(12) United States Patent
Yao et al.

(10) Patent No.: US 11,855,689 B1
(45) Date of Patent: Dec. 26, 2023

(54) ROUTING METHOD AND RELATED DEVICE

(71) Applicant: Beijing University of Posts and Telecommunications, Beijing (CN)

(72) Inventors: Qiuyan Yao, Beijing (CN); Hui Yang, Beijing (CN); Bowen Bao, Beijing (CN); Jie Zhang, Beijing (CN); Shanguo Huang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 18/465,890

(22) Filed: Sep. 12, 2023

(30) Foreign Application Priority Data

Dec. 22, 2022 (CN) .......................... 202211667166.X

(51) Int. Cl.
*H04B 10/07* (2013.01)
*H04B 10/079* (2013.01)
*H04Q 11/00* (2006.01)

(52) U.S. Cl.
CPC ... *H04B 10/07953* (2013.01); *H04Q 11/0062* (2013.01); *H04Q 2011/0073* (2013.01)

(58) Field of Classification Search
CPC ......... H04B 10/07953; H04Q 11/0062; H04Q 2011/0073
See application file for complete search history.

(56) References Cited

U.S. PATENT DOCUMENTS

| | | | |
|---|---|---|---|
| 9,392,347 B1* | 7/2016 | Kodialam | H04J 14/0257 |
| 11,589,287 B2* | 2/2023 | Kuenzi | H04W 40/248 |
| 2002/0126337 A1 | 9/2002 | Uematsu et al. | |
| 2006/0056846 A1* | 3/2006 | Oki | H04J 14/0267 |
| | | | 398/41 |

(Continued)

FOREIGN PATENT DOCUMENTS

| | | |
|---|---|---|
| CN | 106788708 A | 5/2017 |
| CN | 111586502 A | 8/2020 |

(Continued)

OTHER PUBLICATIONS

First Office Action issued in counterpart Chinese Patent Application No. 202211667166.X, dated Jul. 19, 2023.

(Continued)

*Primary Examiner* — Tanya T Motsinger
(74) *Attorney, Agent, or Firm* — Westbridge IP LLC

(57) ABSTRACT

A routing method includes: determining a path quality between a first node and each of second nodes in a service to be transmitted through a path quality evaluation model; where, the second node is one next-hop node of the first node; and the path quality evaluation model is constructed according to a signal-to-noise ratio SNR and an ambient temperature change; determining an optimal next-hop node from second nodes according to the path quality; updating a Q table of the first node according to the optimal next-hop node; taking the optimal next-hop node as a new first node; returning to the step of determining a path quality between a first node and each of second nodes until the new first node (Continued)

is a destination node of the service to be transmitted; and determining a transmission path of the service to be transmitted according to the Q table.

10 Claims, 4 Drawing Sheets

(56) References Cited

U.S. PATENT DOCUMENTS

| | | | | |
|---|---|---|---|---|
| 2009/0135716 | A1* | 5/2009 | Veillette | H04L 45/34 370/328 |
| 2009/0315699 | A1* | 12/2009 | Satish | H04L 45/3065 340/533 |
| 2015/0350062 | A1* | 12/2015 | Lindem, III | H04L 45/22 370/220 |
| 2018/0123724 | A1 | 5/2018 | Zhang et al. | |
| 2018/0123957 | A1 | 5/2018 | Chen et al. | |
| 2019/0261071 | A1* | 8/2019 | Rafique | H04B 10/0793 |
| 2020/0359296 | A1* | 11/2020 | Dugaev | H04B 17/318 |
| 2021/0175993 | A1 | 6/2021 | Liu et al. | |
| 2022/0303864 | A1* | 9/2022 | Arngren | H04W 40/20 |
| 2023/0247484 | A1* | 8/2023 | Sajassi | H04B 7/18513 370/229 |
| 2023/0331217 | A1* | 10/2023 | Wang | B60W 30/09 |

FOREIGN PATENT DOCUMENTS

| | | |
|---|---|---|
| CN | 111770019 A | 10/2020 |
| CN | 112468265 A | 3/2021 |
| CN | 112508172 A | 3/2021 |
| CN | 113612692 A | 11/2021 |
| CN | 113676979 A | 11/2021 |
| WO | 2007024317 A2 | 3/2007 |
| WO | 2022214191 A1 | 10/2022 |

OTHER PUBLICATIONS

Hao et al., An Adaptive Clustering Strategy for MANET Based on Learning Automata Theory and Stability Control, ACS Photonics, 2018, 41(9), pp. 2089-2105, dated Sep. 30, 2018.

Pan et al., Quality Optimization Research on Optical Path Transmission in Damage Perceptual Optical Network, Information & Communications, 2014, 1, pp. 10-11, dated Jan. 15, 2014.

Zhan et al., Quality Evaluation of Auto-adaptative Frequency-hopping Channel Based on Receiving Signal-to-Noise Ratio Prediction, Ship Electronic Engineering, 2008, 28(4), pp. 76-79, dated Apr. 20, 2008.

* cited by examiner

ROUTING METHOD AND RELATED DEVICE

CROSS-REFERENCE TO RELATED APPLICATIONS

This application claims priority to Chinese Patent Application No. 202211667166.X, filed on Dec. 22, 2022, the content of which is incorporated herein by reference in its entirety.

TECHNICAL FIELD

The present application relates to communication technologies, and particularly to routing methods and related devices.

BACKGROUND

In an Optical Network on Chip (ONoC), optical signals passing through various optical devices will be affected by crosstalk noises and losses of the optical signals may occur. At ultra-deep submicron/nano processes, losses and crosstalk noises will be main factors affecting transmission quality. Especially, in a Wavelength Division Multiplexing (WDM) based ONoC, with an increasing number of optical devices, large losses may occur on optical signals with different wavelengths during transmissions. Moreover, additional intra-channel and inter-channel crosstalk may be introduced, which further causes deterioration in the transmission quality of the optical signals, and even leads to transmission errors. Moreover, due to a thermo-optic effect, a resonant wavelength of a silicon-based microring resonator may be shifted with changes of an ambient temperature. Temperature deviations on a chip will result in additional optical losses, which further affects the transmission quality.

SUMMARY

Examples of the present disclosure provides a routing method, which includes: determining a path quality between a first node and each of a plurality of second nodes in a service to be transmitted through a path quality evaluation model; where, the second node is one next-hop node of the first node; and the path quality evaluation model is constructed according to a signal-to-noise ratio (SNR) and an ambient temperature change; determining an optimal next-hop node from the plurality of second nodes according to the path quality; updating a Q table of the first node according to the optimal next-hop node; taking the optimal next-hop node as a new first node; returning to the step of determining a path quality between a first node and each of a plurality of second nodes until the new first node is a destination node of the service to be transmitted; and determining a transmission path of the service to be transmitted according to the Q table.

Examples of the present disclosure also provides an electronic device, which includes a memory, a processor, and a computer program which is stored on the memory and can run on the processor, where, the routing method according to any example of the present disclosure is implemented when the processor is executing the program.

Examples of the present disclosure also provides a non-transitory computer-readable storage medium storing a computer instruction, where, the computer instruction is used to make a computer execute the routing method according to any example of the present disclosure.

As can be seen, in the routing method and related device disclosed, influences of crosstalk, losses and thermal sensitivity factors on a transmission quality of an optical signal in an ONoC can be comprehensively considered in a Q-learning manner according to communication status of the ONoC. Further, Q tables of router nodes can be updated according to a path quality evaluation model constructed, and a transmission path of a service to be transmitted can be determined according to the Q tables, such that a transmission of the service can be completed. Therefore, influences of complex factors such as crosstalk, losses, thermal effects, and etc. on the transmission quality can be comprehensively evaluated, and adaptive routing of the ONoC can be implemented according to the evaluation results. In this case, the quality of the optical signal can be effectively guaranteed, and the performance of the ONoC can be improved. Therefore, the problems of deteriorations in the transmission quality of main optical signals and transmission errors caused by the increasing number of optical devices, large losses generated by a number of optical signals with different wavelengths and additional intra-channel and inter-channel crosstalk introduced by the optical signals can be solved.

BRIEF DESCRIPTION OF THE DRAWINGS

In order to describe the technical solutions in one or more examples of the present disclosure or the prior art more clearly, the following briefly introduces accompanying drawings for describing the examples or the prior art. Apparently, the accompanying drawings in the following description show only the examples of the present disclosure, and those of ordinary skill in the art may still derive other drawings from these drawings without any creative efforts.

DETAILED DESCRIPTION OF THE EMBODIMENTS

Figure 1:
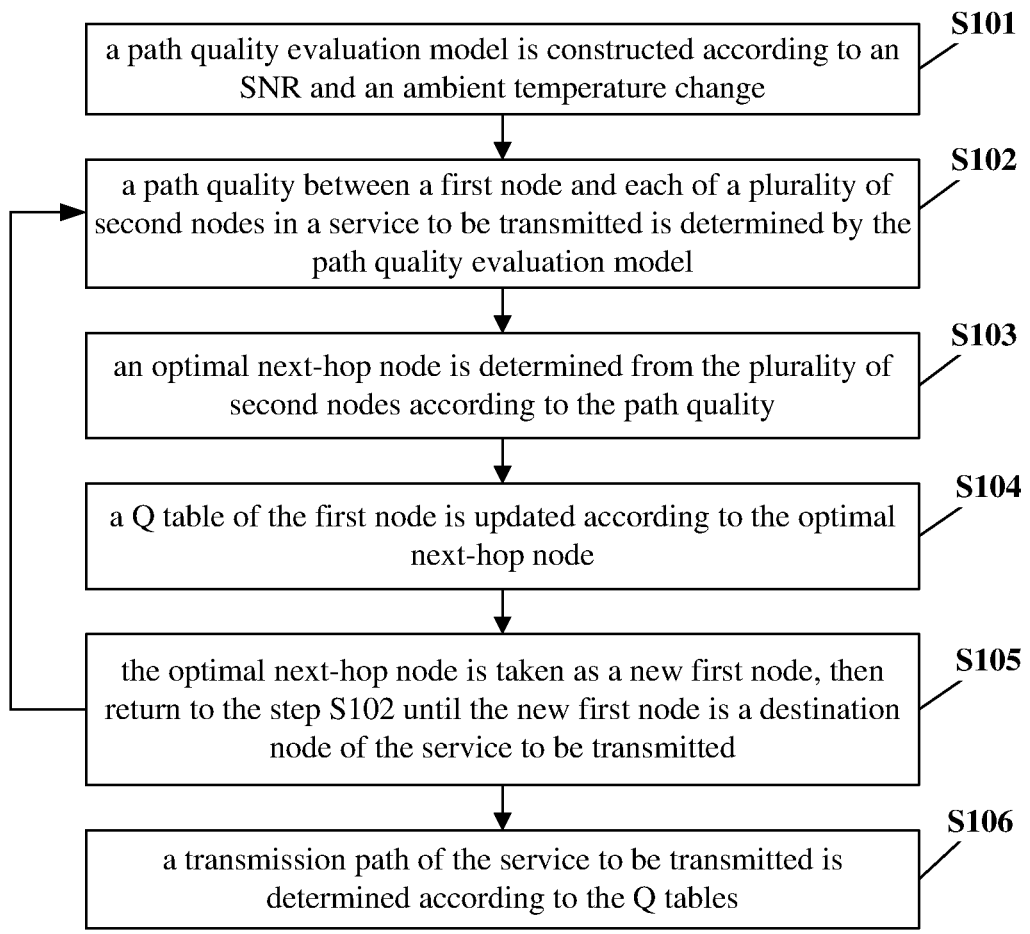
FIG. 1 is a flowchart of a routing method according to an example of the present disclosure.

Hereinafter, in order to make the objective(s), technical solution(s) and advantages of the present application clearer and more understandable, the present application will be further described in detail, in connection with specific embodiments and with reference to the accompanying drawings.

It is necessary to be noted that the technical terms or scientific terms used in the embodiments of the present application should have common meanings as understood by those skilled in the art of the present application, unless otherwise defined. The "first", "second" and similar words used in the embodiments of the present application do not refer to any sequence, number or importance, but are only used to distinguish different component portions. The "comprise", "include" or a similar word means that an element or item before such word covers an element or item or any equivalent thereof as listed after such word, without excluding other elements or items. The "connect" or "interconnect" or a similar word does not mean being limited to a physical or mechanical connection, but may include a direct or indirect electrical connection. The "upper", "lower", "left" and "right" are used only to indicate a relative position relation, and after the absolute position of the described object is changed, the relative position relation may be changed accordingly.

As mentioned in the background, in an ONoC, optical signals passing through various optical devices will be affected by crosstalk noises and losses of the optical signals may occur. At ultra-deep submicron/nano processes, losses and crosstalk noises will be main factors affecting transmission quality. Especially, in a Wavelength Division Multiplexing (WDM) based ONoC, with an increasing number of optical devices, large losses may occur on optical signals with different wavelengths during transmissions. Moreover, additional intra-channel and inter-channel crosstalk may be introduced, which further causes deterioration in the transmission quality of the optical signals, and even leads to transmission errors. Moreover, due to a thermo-optic effect, a resonant wavelength of a silicon-based microring resonator may be shifted with changes of an ambient temperature. Temperature deviations on a chip will result in additional optical losses, which further affects the transmission quality.

Based on the above considerations, an example of the present disclosure provides a routing method. The routing method disclosed is an adaptive routing method based on Q-learning.

The routing method may include the following steps: determining a path quality between a first node and each of a plurality of second nodes of a service to be transmitted by a path quality evaluation model, where the second node is any next-hop node of the first node; and the path quality evaluation model is constructed according to a signal-to-noise ratio and an ambient temperature change; determining an optimal next-hop node from the plurality of second nodes according to the path quality; updating a Q table of the first node according to the optimal next-hop node; taking the optimal next-hop node as a new first node; returning to the step of determining a path quality until the new first node is a destination node of the service to be transmitted; and determining a transmission path of the service to be transmitted according to the Q tables.

As can be seen, in the routing method disclosed, influences of crosstalk, losses and thermal sensitivity factors on a transmission quality of an optical signal in an ONoC can be comprehensively considered in a Q-learning manner according to communication status of the ONoC. Further, Q tables of router nodes can be updated according to a path quality evaluation model constructed, and a transmission path of a service to be transmitted can be determined according to the Q tables, such that a transmission of the service can be completed. Therefore, influences of complex factors such as crosstalk, losses, thermal effects, and etc. on the transmission quality can be comprehensively evaluated, and adaptive routing of the ONoC can be implemented according to the evaluation results. In this case, the quality of the optical signal can be effectively guaranteed, and the performance of the ONoC can be improved. Therefore, the problems of deteriorations in the transmission quality of main optical signals and transmission errors caused by the increasing number of optical devices, large losses generated by a number of optical signals with different wavelengths and additional intra-channel and inter-channel crosstalk introduced by the optical signals can be solved.

FIG. 1 illustrates a flowchart of a routing method according to an example of the present disclosure. The routing method disclosed is an adaptive routing method based on Q-learning. According to FIG. 1, the routing method may include the following steps.

In step S101, a path quality evaluation model is constructed according to a signal-to-noise ratio (SNR) and an ambient temperature change obtained.

In step S102, a path quality between a first node and each of a plurality of second nodes in a service to be transmitted is determined by the path quality evaluation model.

In examples of the present disclosure, a second node refers to one next-hop node of the first node.

In step S103, an optimal next-hop node is determined from the plurality of second nodes according to the path quality.

In step S104, a Q table of the first node is updated according to the optimal next-hop node.

In step S105, the optimal next-hop node is taken as a new first node, then returned to the step S102 until the new first node is a destination node of the service to be transmitted.

In step S106, a transmission path of the service to be transmitted is determined according to the Q tables.

Hereinafter, the routing method disclosed by the present disclosure is described in detail with reference to the drawings and specific examples.

Hereinafter, the routing method disclosed by the present disclosure would be described in detail with reference to the drawings and specific examples.

First, assuming that a topology of an ONoC can be represented as an undirected graph G(V, E), where, V represents a set of router nodes in the ONoC, and E represents a set of physical links of the ONoC. In some examples, the physical links may refer to optical waveguides. In the examples, a router node can be represented as v(x, y), where, x represents a position of the router node on an x-axis and y represents a position of the router node on a y-axis. Further, a request of an optical signal in the an ONoC can be defined as r(s, d, SNRr), where, s represents a source node; d represents a destination node; and SNRr represents a SNR requirement of the request. To be noted, s and d can be both represented by coordinates, for example, s (1,0) and d (3,3). Further, each router node may be associated with a "state". Forwarding a signal from a current router node to a router node adjacent to the current router can be called as an "action". The process of an adaptive routing of a router node involved in the present disclosure may be described as starting from a certain state, selecting a certain action according to a path quality evaluation result, and transferring from the certain state to another state.

Specifically, in the step S101, the SNR and the ambient temperature change needs to be obtained at first.

Figure 2:
FIG. 2 is a schematic diagram of a modulator model according to an example of the present disclosure.

FIG. 2 is a schematic diagram of a modulator model according to an example of the present disclosure.

Figure 3:
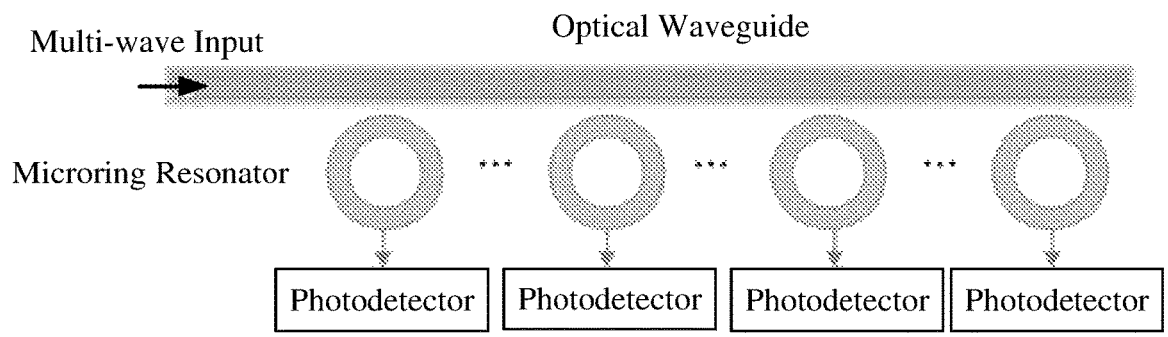
FIG. 3 is a schematic diagram of a photodetector model according to an example of the present disclosure.

FIG. 3 is a schematic diagram of a photodetector model according to an example of the present disclosure.

As for the SNR, in some examples of the present disclosure, each router node is connected with a local intellectual property (IP) core, which is represented as $P_k$ (k=1, 2, . . . ,K), where, K refers to a total number of the IP cores, as shown in FIG. 2 and FIG. 3, when a source IP core $P_s$ needs to send information to a destination IP core $P_d$, an off-chip laser is used to generate an optical signal, the optical signal is then modulated by a modulator in an electro-optical interface of $P_s$, transmitted in the ONoC, and finally detected at a photodetector in an electro-optical interface of $P_d$.

A power of the optical signal received at the destination IP core $P_d$ can be determined by the following equation.

$$PL_{(P_s,P_d)}^{\lambda_i} = P_0^{\lambda_i} L_{P_s}^{\lambda_i} L_{net}^{\lambda_i} L_{P_d}^{\lambda_i}$$

Where, $PL_{(P_s,P_d)}^{\lambda_i}$ represents power of the optical signal received at the destination IP core $P_d$; $P_0^{\lambda_i}$ represents a power of an optical signal with a wavelength $\lambda_i$ generated by off-chip laser; $L_{P_s}^{\lambda_i}$ represents a modulation loss generated at the source IP core $P_s$; $L_{net}^{\lambda_i}$ represents losses generated by the router nodes in the ONoC; and $L_{P_d}^{\lambda_i}$ represents a detection loss generated at the destination IP core $P_d$.

Furthermore, crosstalk noises during transmissions may also be introduced into the optical signal transmitted in the ONoC.

Specifically, in some example of the present disclosure, the crosstalk noises can be determined by the following equation.

$$PN_{(P_s,P_d)}^{\lambda_i} = PN_{P_s}^{\lambda_i} + PN_{net}^{\lambda_i} + PN_{P_d}^{\lambda_i}$$

Where, $PN_{(P_s,P_d)}^{\lambda_i}$ represents a power of the crosstalk noises; $PN_{P_s}^{\lambda_i}$ represents a power of crosstalk noises introduced by the modulator at the source IP core $P_s$; $PN_{net}^{\lambda_i}$ represents a power of crosstalk noises introduced in the ONoC; and $PN_{P_d}^{\lambda_i}$ represents a power of crosstalk noises introduced by the photodetector at the destination IP core $P_d$.

In this case, the SNR can be determined according to the power of the optical signal and power of the crosstalk noises.

In some examples of the present disclosure, the signal-to-noise ratio SNR can be determined by the following equation.

$$SNR^{\lambda_i} = 10 \log \left( \frac{PL_{(P_s,P_d)}^{\lambda_i}}{PN_{(P_s,P_d)}^{\lambda_i}} \right)$$

Where, $SNR^{\lambda_i}$ represents the SNR; $PL_{(P_s,P_d)}^{\lambda_i}$ represents the power of the optical signal received at the destination IP core $P_d$; and $PN_{(P_s,P_d)}^{\lambda_i}$ represents the power of the crosstalk noises. It can be seen that, in the above step, the crosstalk noises and the losses in an actual situation are taken into account.

Further, as disclosed above, the ambient temperature change also needs to be obtained.

A thermal effect of the ONoC is mainly caused by thermal sensitivity of a microring resonator. The microring resonator is a basic component of an optical switching element, and a resonator wavelength of the microring resonator exhibits a linear shift with temperature.

A relation between the resonant wavelength $\lambda_{MR}$ of the microring resonator and the ambient temperature $T_e$ may be represented by the following equation.

$$\lambda_{MR} = \lambda_0 + \rho \cdot (T_e - T_0)$$

Where, $\lambda_{MR}$ represents the resonant wavelength of the microring resonator; $\lambda_0$ represents an expected resonant wavelength at an expected operating temperature $T_0$; $\rho$ represents a thermally induced wavelength shift coefficient; and $T_e$ represents the ambient temperature.

In a specific process of obtaining an ambient temperature change, an ambient temperature and an expected operating temperature need to be obtained. Further, a difference between the ambient temperature and the expected operating temperature is computed to obtain the ambient temperature change. It should be noted that the expected operating temperature can be regarded as a known parameter.

Specifically, the ambient temperature can be determined by the following equation.

$$T_e = T_0 + \left( \frac{\sqrt{\frac{\theta^2}{4} \left( \frac{2\kappa^2}{2\kappa^2 + \kappa_p^2} \right) \cdot 10^{\frac{PL_{MR}^T}{10}} - \frac{\theta^2}{4}} + (\lambda_{TX} - \lambda_0)}{\rho} \right)$$

Where, $T_e$ represents the ambient temperature; $T_0$ represents the expected operating temperature; $\theta$ represents a −3 dB bandwidth of an optical power transmission spectrum at a drop port of the microring resonator; $\kappa$ represents a coupling coefficient of optical powers in a wake-up waveguide and a straight waveguide; $K_p^2$ represents an inherent power loss of an optical signal transmitted in an annular waveguide for one cycle; $PL_{MR}^T$ represents an optical power loss at the drop port of the microring resonator; $\lambda_{TX}$ represents a wavelength of an incident optical signal emitted by a laser; and $\lambda_0$ represents an expected resonant wavelength at the expected operating temperature. As can be seen, in the above step, the thermal sensitivity factor in an actual situation can be taken into account.

In examples of the present disclosure, the optical power loss at the drop port of the microring resonator described above can be determined by the following equation.

$$PL_{MR}^T = 10 \log \left( \left( \frac{2\kappa^2 + \kappa_p^2}{2\kappa^2} \right)^2 \cdot \left( 1 + \frac{4(\lambda_{TX} - \lambda_0 - \rho \cdot (T_e - T_0))^2}{\theta^2} \right) \right)$$

Where, $PL_{MR}^T$ represents the optical power loss at the drop port of the microring resonator; $K$ represents the coupling coefficient of the optical power in the wake-up waveguide and the straight waveguide; $K_p^2$ represents the inherent power loss of the optical signal transmitted in the annular waveguide for one cycle; $\lambda_{TX}$ represents the wavelength of the incident optical signal emitted by the laser; $\lambda_0$ represents the expected resonant wavelength at the expected operating temperature; $\rho$ represents the thermally induced wavelength shift coefficient; $T_e$ represents the ambient temperature; $T_0$ represents the expected operating temperature; and $\theta$ represents the −3 dB bandwidth of the optical power transmission spectrum at the drop port of the microring resonator.

In the above step, the SNR and the ambient temperature change can be obtained, and the path quality evaluation model can be constructed according to the obtained SNR and the ambient temperature change.

In some examples of the present disclosure, the path quality evaluation model can be represented by the following equation.

$$q(a, b) = \frac{1}{SNR^{\lambda_i}} + \Delta T$$

Where, $q(a, b)$ represents a path quality from node a to node b; $SNR^{\lambda_i}$ represents the SNR; and $\Delta T$ represents the ambient temperature change.

Further, the path quality evaluation model constructed can be used to determine the path quality of a specific service to be transmitted. Specifically, while evaluate the path quality of a specific service, a source node and a destination node of the service to be transmitted should be determined at first. Starting from the source node, the path quality between the first node and the second node can be determined by the path quality evaluation model. In the above process, the first node corresponds to the source node, the second node corresponds to any one of next-hop nodes of the source node. After the path quality between the two nodes is determined, an optimal next-hop node can be determined from all the second nodes according to the path quality. Specifically, a second node with a minimum value of the path quality can be selected as the optimal next-hop node from all the second nodes.

Further, after the optimal next-hop node is determined, a Q table of the first node should be updated according to the optimal next-hop node. Specifically, each router node in the ONoC maintains a Q table, the Q table includes a state space column, an action space column, and a Q value column. The state space column stores address information of the current router node, address information of a destination router node and address information of a next-hop node. After the optimal next-hop node is determined, the address information of the next-hop node can be updated in the Q table. Furthermore, after the optimal next-hop node is determined, a direction of the optimal next-hop node relative to the first node can also be obtained and recorded in the Q table of the first node. The address information of the current router node refers to the address information of the first node, which is already known. Moreover, the address information of the destination router node can be obtained according to the service to be transmitted. The state space column is configured to store the direction of the next-hop node.

The Q value column is configured to store an estimated value of the path quality from the next-hop node to the destination router node, and is represented by $Q_c(i, d)$. Where, c represents the current router node; i represents an element in a next-hop node set I; and d represents the destination router node. The estimated value of the path quality includes three evaluation indexes, which are optical loss, crosstalk and system temperature change caused by optical transmission. The smaller the Q value is, the higher the path quality to the destination router node is.

Further, the estimated value of the path quality can be updated by the following equation.

$$Q'_c(i_1, d) = Q_c(i_1, d) + \delta \cdot \left[ q(x, i_1) + \min_{z \in I^*(i_1)} q_{i_1}(z, d) \right]$$

Where, $Q'_c(i_1, d)$ represents an updated estimated value of the path quality of a first node; $Q_c(i_1, d)$ represents an original estimated value of the path quality of the first node; $\delta$ represents a learning rate; $q(x, i_1)$ represents a value of the path quality from the first node x to the optimal next-hop node;

$$\min_{z \in I^*(i_1)} q_{i_1}(z, d)$$

represents a minimum value of the path quality from the optimal next-hop node to the destination router node d through a router node z; and $I^*(i_1)$ represents a neighbor node set of the optimal next-hop node except the first node.

After updating the estimated value of the path quality of the first node, the Q value column in the Q table can be updated synchronously.

Further, the optimal next-hop node can be taken as a new first node. Then, corresponding new second nodes can be searched for according to the new first node, and a new optimal next-hop node can be determined according to the path quality evaluation model until the new first node is determined to be the destination node of the service to be transmitted. Certainly, in the above process, the Q table of a corresponding router node should also be updated correspondingly. The updating process is similar to the above steps and would not be repeated herein.

Further, a transmission path of the service to be transmitted can be determined according to the updated Q tables. Specifically, the transmission path of the service to be transmitted can be determined according to the directions of the optimal next-hop node relative to the first node in the Q table.

Figure 4:
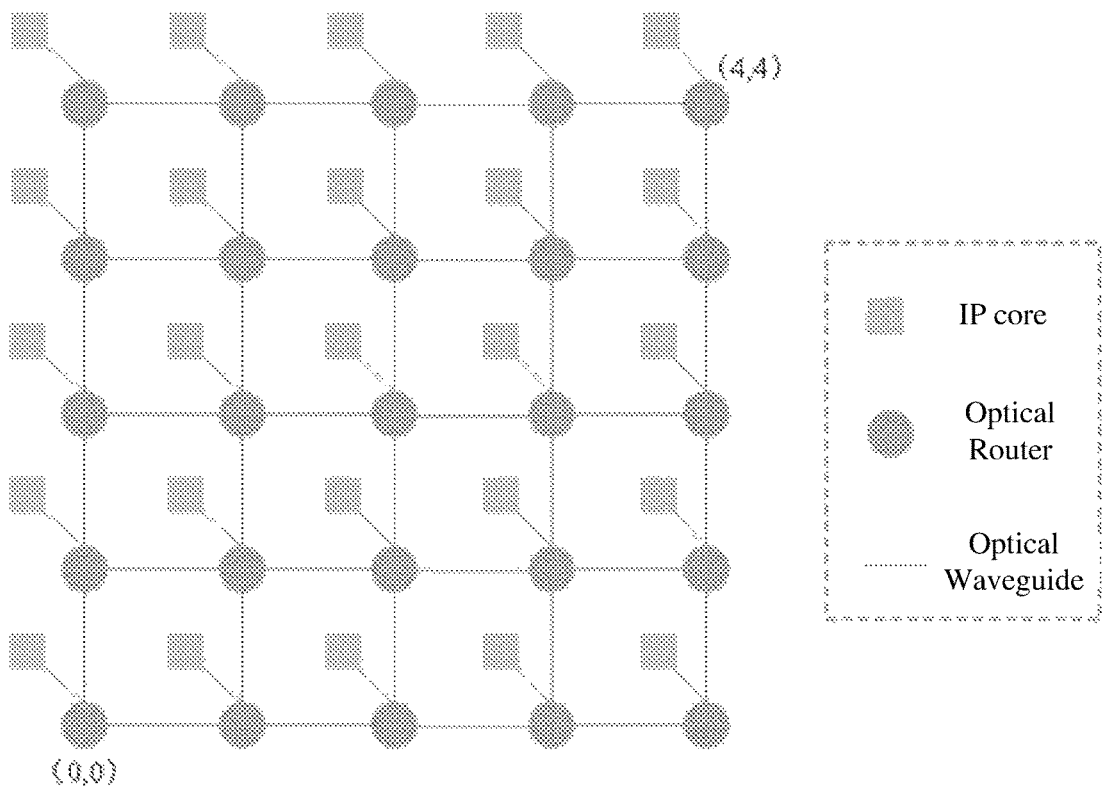
FIG. 4 is a schematic diagram of an Optical Network on Chip according to an example of the present disclosure.

FIG. 4 is a schematic diagram of an ONoC according to an example of the present disclosure.

In another example, a service r(s, d, SNRr) arrives in a 2D mesh ONoC with a size of as shown in FIG. 4. Parameters related to the service r are extracted to obtain: s (0,0), d (3,3), and SNRr. Further, the path quality can be determined according to the steps in the above example, and then an optimal next-hop node can be determined.

Figure 5:
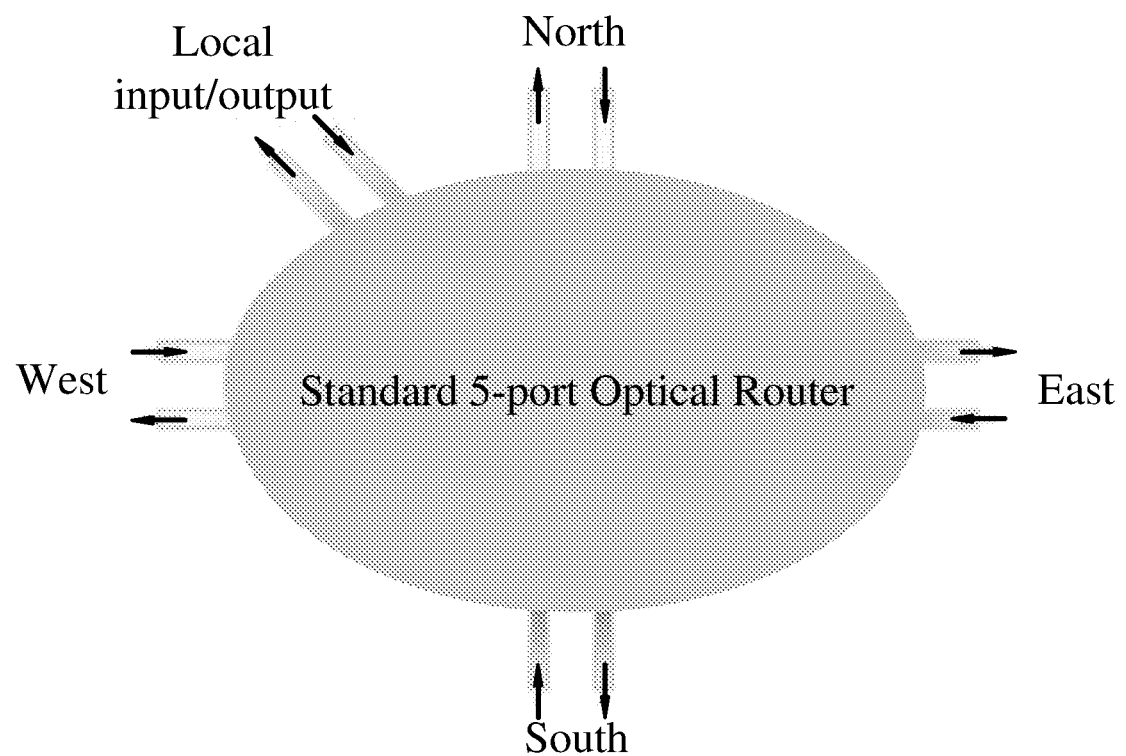
FIG. 5 is a schematic diagram of an optional transmission direction according to an example of the present disclosure.

FIG. 5 is a schematic diagram illustrating an optional transmission direction according to an example of the present application.

In this example, a transmission direction with a minimum path quality can be selected from optional transmission directions. The transmission directions include four directions of east, west, south and north in a standard 5-port optical router model as shown in FIG. 5. Under the condition that a current node is (2,1), optional transmission directions are north and east. Since a direction with a minimum path quality needs to be selected as the final transmission direction, the north direction should be selected as the final transmission direction. A router node in this transmission direction should be determined as a next-hop node, such that a next-hop node of (2,1) is (2,2). It should be noted that the above steps are only described by taking (2,1) coordinates as an instance. Those skilled in the art should understand that the process of other coordinate points are similar to the above steps, which would not be described herein.

Further, a new estimated value of the path quality can be determined according to the equation for updating the estimated value of the path quality in the above example.

Similarly, other data in the Q table also needs to be updated. For a service r with a source node being s(0, 0) and a destination node being d (3, 3), under the condition that a current node is (2, 1), then an optimal next-hop node is (2, 2). Certainly, an estimated value of the path quality from the current node to the destination node (3, 3) through the node (2, 2) is the smallest.

Whether a next-hop node is the destination node should be determined. If the next-hop node is the destination node, the routing process is stopped. Otherwise, the above steps are repeated.

Further, a final service transmission route can be determined according to the directions in the updated Q tables.

Figure 6:
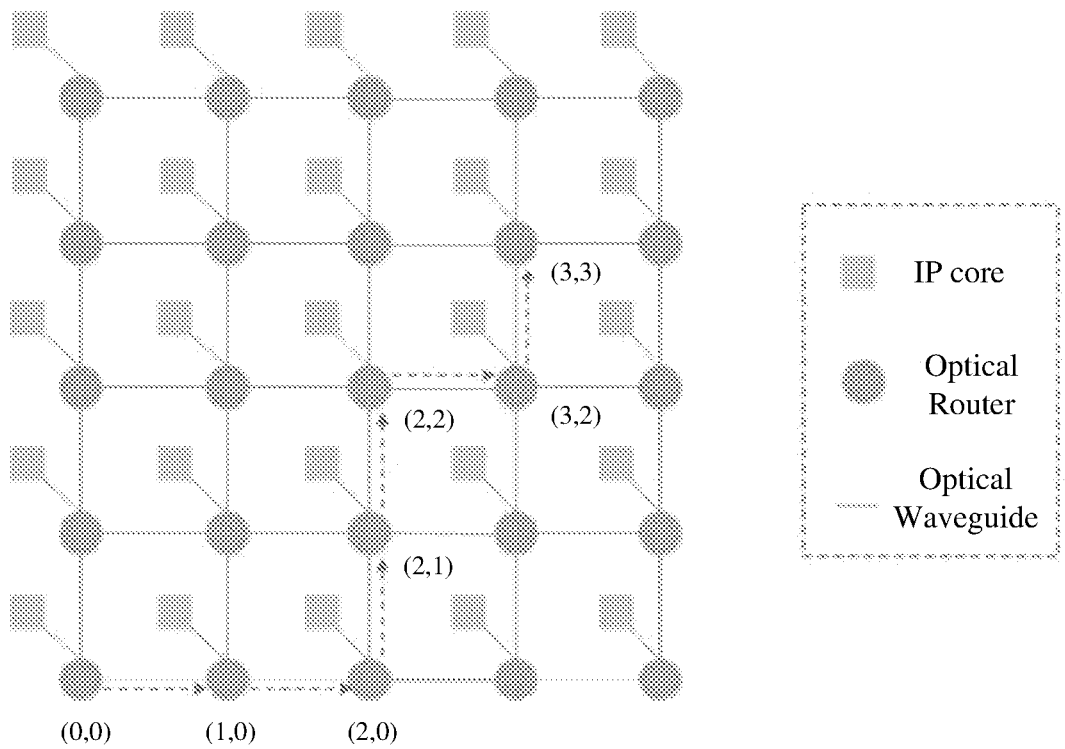
FIG. 6 is a schematic diagram of a final route of a service r according to an example of the present disclosure.

FIG. 6 is a schematic diagram illustrating a final routing result of a service r according to an example of the present disclosure.

As can be seen from FIG. 6, a routing result finally selected for the service r is (0,0) to (1,0) to (2,0) to (2,1) to (2,2) to (3,2) to (3,3).

As can be seen from the above examples, the examples of the present application provide an adaptive routing method based on Q-learning. The method may include: determining a path quality between a first node and each of a plurality of second nodes of a service to be transmitted by a path quality evaluation model, where the second node is any next-hop node of the first node; and the path quality evaluation model is constructed according to a signal-to-noise ratio and an ambient temperature change; determining an optimal next-hop node from the plurality of second nodes according to the path quality; updating a Q table of the first node according to the optimal next-hop node; taking the optimal next-hop node as a new first node; returning to the step of determining a path quality until the new first node is a destination node of the service to be transmitted; and determining a transmission path of the service to be transmitted according to the Q tables. In the routing method disclosed, influences of crosstalk, losses and thermal sensitivity factors on a transmission quality of an optical signal in an ONoC can be comprehensively considered in a Q-learning manner according to communication status of the ONoC. Further, Q tables of router nodes can be updated according to a path quality evaluation model constructed, and a transmission path of a service to be transmitted can be determined according to the Q tables, such that a transmission of the service can be completed. Therefore, influences of complex factors such as crosstalk, losses, thermal effects, and etc. on the transmission quality can be comprehensively evaluated, and adaptive routing of the ONoC can be implemented according to the evaluation results. In this case, the quality of the optical signal can be effectively guaranteed, and the performance of the ONoC can be improved. Therefore, the problems of deteriorations in the transmission quality of main optical signals and transmission errors caused by the increasing number of optical devices, large losses generated by a number of optical signals with different wavelengths and additional intra-channel and inter-channel crosstalk introduced by the optical signals can be solved.

It should be noted that the method disclosed can be executed by a single device, such as a computer or a server. The method disclosed can also be applied to a distributed scene, and can be completed by a plurality of devices cooperating with each other. In the case of such a distributed scene, one of the plurality of devices can only execute one or more steps of the method in the examples of the present application, and the plurality of apparatuses may interact with each other to complete the method.

It should be noted that some examples of the present disclosure are described above. Other examples fall within the scope of the appended claims. In some cases, actions or steps recited in the claims can be executed in a different order than in the examples described above and still achieve desirable results. Additionally, processes depicted in the drawings do not necessarily require a particular order shown, or sequential order, to achieve desired results. In some examples, multitasking processing and parallel processing are also possible or may be advantageous.

Based on the same inventive concept, corresponding to any one of the above example methods, the present application further provides an electronic device, which includes a memory, a processor, and a computer program stored on the memory and operable on the processor. The processor implements the routing method in the any one of the above examples when executing the program.

Figure 7:
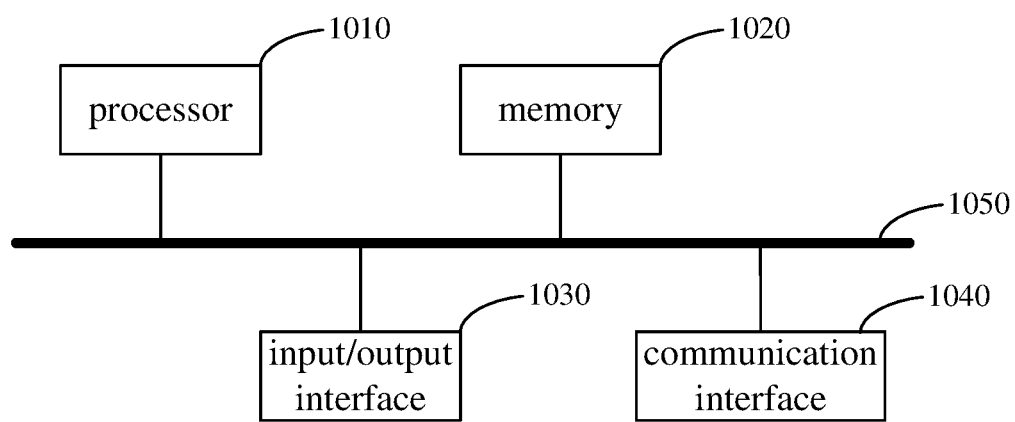
FIG. 7 is a schematic structural diagram of an electronic device according to an example of the present disclosure.

FIG. 7 shows a diagram of hardware structure of a more specific electronic device as provided in the present disclosure. The device may comprise: a processor 1010, a memory 1020, an input/output interface 1030, a communication interface 1040 and a bus 1050. Herein, the processor 1010, the memory 1020, the input/output interface 1030 and the communication interface 1040 are in communication connection with one another in the device by the bus 1050.

The processor 1010 may be embodied by a general CPU (central processing unit), a microprocessor, an ASIC (Application Specific Integrated Circuit), or one or more integrated circuits, for executing related programs to implement the technical solutions as provided in the examples of the present description.

The memory 1020 may be embodied by a ROM (Read Only Memory), an RAM (Random Access Memory), a static storage device, a dynamic storage device, or other forms. The memory 1020 may store an operation system or other application programs. When the technical solutions as provided in the examples of the present description are implemented by software or firmware, the related program codes are stored in the memory 1020, and are called by the processor 1010 for execution.

The input/output interface 1030 is used to connect with an input/output module, to achieve information input and output. The input/output module may be used as a component configured in the device (not shown in the figure), or may be externally connected with the device to provide the respective function(s). Herein, the input device may comprise a keyboard, a mouse, a touch screen, a microphone, various types of sensors, and the like. The output device may comprise a display, a loudspeaker, a vibrator, an indication lamp, and the like.

The communication interface 1040 is used to connect with a communication module (not shown in the figure), to achieve communication interaction of the present device with other devices. Herein, the communication module may achieve communication via a wired manner (such as USB, netting wires, etc.), or may achieve communication via a wireless manner (such as mobile network, WiFi, Bluetooth, etc.).

The bus 1050 transmits information between various components (such as the processor 1010, the memory 1020, the input/output interface 1030 and the communication interface 1040) of the device.

It should be explained that though only the processor 1010, the memory 1020, the input/output interface 1030, the communication interface 1040 and the bus 1050 are shown in the above device, the device in a specific implementation process may further comprise other components necessary for normal operation. In addition, it is understandable for those skilled in the art that the above device may only comprise the components necessary to implement the solution of the examples of the present description, rather than all the components as shown in the figure.

The electronic device in the above example is used to implement the corresponding routing method based on federated learning according to any example as above, and has the beneficial effect(s) of the corresponding routing method, which will not be repeated herein.

Based on the same inventive concept, corresponding to the method according to any above embodiment, a non-transitory computer-readable storage medium storing a computer instruction is further provided in the present application, where the computer instruction is used to make a computer execute the routing method based on federated learning according to any embodiment as above.

The computer-readable storage medium of the present embodiment comprises volatile and non-volatile, mobile and non-mobile media, and can store information by any method or technology. The information may be computer-readable instructions, data structures, program modules or other data. Examples of the storage medium for computers comprise, but are not limited to, a phase change RAM (PRAM), a static random access memory (SRAM), a dynamic random access memory (DRAM), RAMs of other types, a read-only memory (ROM), an electrically erasable programmable read-only memory (EEPROM), a flash memory or memories with other technologies, a compact disc read-only memory (CD-ROM), a digital video disk (DVD) or other optical memories, a cassette tape, a magnetic tape or disk storage or other magnetic storage devices or any other non-transmittable media, and can store information which can be accessed by a computing device.

The storage medium in the above embodiment stores the computer instruction which is used to make the computer execute the routing method based on federated learning according to any embodiment as above, and has the beneficial effect(s) of the corresponding method embodiment, which will not be repeated herein.

It should be understandable by those skilled in the art that the discussion on any above embodiment is provided only in an exemplary manner, and it is not intended to suggest/imply that the scope of the present application (comprising the claims) is limited to these examples. In the concept of the present application, the technical features in the above embodiments or different embodiments can be combined, the steps thereof can be implemented in any sequence. There are many other variations to the different aspects of the present application as described above, and these variations are not provided in detail for concision.

In addition, in order to simplify the explanation and discussion and to make the embodiments of the present application more understandable, the well known power source/grounding connection of IC chips and other components may or may not be shown in the provided figures. In addition, a device may be shown in a manner of block diagram to make the embodiments of the present application more understandable, and consideration is taken based on the facts that the details in the implementation manner of the device in the block diagram(s) are highly dependent on the context for implementing an embodiment of the present application (that is, these details should completely fall within the scope as understood by those skilled in the art). When specific details (such as circuits) are explained to describe the exemplary embodiment of the present application, it is obvious for those skilled in the art to implement the embodiments of the present application without these specific details or with these specific details changed. Therefore, the description should be considered as illustrative, rather than in a limiting sense.

Though the present application has been described in connection with specific embodiments of the present application, several substitutions, modifications and variations to these embodiments according to the above description will be obvious to those skilled in the art. For example, other memory architectures (such as dynamic RAM (DRAM)) may use the embodiments as discussed.

The embodiments of the present application are intended to cover any of such substitutions, modifications and variations within a broad scope of the appended claims. Therefore, any omission, modification, equivalent substitution, improvement, and the like made within the spirit and principle of embodiments of the present application will fall within the protection scope of the present application.

What is claimed is:

1. An adaptive routing method based on Q-learning, comprising:
    constructing a path quality evaluation model according to a signal-to-noise ratio (SNR) and an ambient temperature change;
    calculating a path quality between a first node and each of a plurality of second nodes in a service to be transmitted through the path quality evaluation model; wherein, the second node is one next-hop node of the first node;
    determining an optimal next-hop node from the plurality of second nodes according to the path quality and taking the optimal next-hop node as a new first node;
    updating a Q table of the first node according to the optimal next-hop node;
    determining a new optimal next-hop node according to the new first node;
    in response to determining the new first node is a destination node of the service to be transmitted, stopping calculating; and
    determining a transmission path of the service to be transmitted according to the Q table.

2. The method according to claim 1, wherein the SNR is determined by:
    sending an optical signal by a source intellectual property (IP) core to a destination IP core;
    obtaining a power of the optical signal received at the destination IP core;
    calculating a power of crosstalk noises of the optical signal according to a power of crosstalk noises at the source IP core, a power of crosstalk noises in an ONoC, and a power of crosstalk noises at the destination IP core; and
    calculating the SNR according to the power of the optical signal and the power of the crosstalk noises.

3. The method according to claim 1, wherein the ambient temperature change is determined by:
    obtaining an ambient temperature and an expected operating temperature; and
    calculating a difference between the ambient temperature and the expected operating temperature to obtain the ambient temperature change; wherein,
    the ambient temperature is calculated according to the following equation:

$$T_e = T_0 + \left( \frac{\sqrt{\frac{\theta^2}{4}\left(\frac{2\kappa^2}{2\kappa^2 + \kappa_p^2}\right) \cdot 10^{\frac{PL_{MR}^T}{10}} - \frac{\theta^2}{4}} + (\lambda_{TX} - \lambda_0)}{\rho} \right)$$

wherein, $T_e$ represents the ambient temperature; $T_0$ represents the expected operating temperature; $\theta$ represents a $-3$ dB bandwidth of an optical power transmission spectrum at a drop port of a microring resonator; $K$ represents a coupling coefficient of optical power in a wake-up waveguide and a straight waveguide; $K_p^2$ represents an inherent power loss of an optical signal transmitted in an annular waveguide for one cycle; $PL_{MR}^T$ represents an optical power loss at the drop port of the microring resonator; $\lambda_{TX}$ represents a wavelength of an incident optical signal emitted by a laser; and $\lambda_0$ represents an expected resonant wavelength at the expected operating temperature.

4. The method according to claim 1, wherein the path quality evaluation model is represented by the following equation:

$$q(a, b) = \frac{1}{SNR^{\lambda_i}} + \Delta T$$

wherein, q(a, b) represents a path quality from node a to node b; $SNR^{\lambda_i}$ represents the SNR; and $\Delta T$ represents the ambient temperature change.

5. The method according to claim 1, wherein determining an optimal next-hop node from the plurality of second nodes according to the path quality comprises:
   taking a second node with a minimum value of the path quality as the optimal next-hop node.

6. The method according to claim 1, wherein updating the Q table of the first node according to the optimal next-hop node comprises:
   obtaining a direction of the optimal next-hop node relative to the first node according to the optimal next-hop node;
   calculating an estimated value of the path quality according to the optimal next-hop node and the destination node of the service to be transmitted; and
   updating the Q table of the first node according to the direction of the optimal next-hop node relative to the first node and the estimated value of the path quality.

7. The method according to claim 6, wherein the estimated value of the path quality is updated according to the following equation:

$$Q'_c(i_1, d) = Q_c(i_1, d) + \delta \cdot \left[ q(x, i_1) + \min_{z \in I^*(i_1)} q_{i_1}(z, d) \right]$$

wherein, $Q'_c(i_1, d)$ represents an updated estimated value of the path quality of the first node; $Q_c(i_1, d)$ represents an original estimated value of the path quality of the first node; $\delta$ represents a learning rate; $q(x, i_1)$ represents a value of the path quality from the first node x to the optimal next-hop node;

$$\min_{z \in I^*(i_1)} q_{i_1}(z, d)$$

represents a minimum value of the path quality from the optimal next-hop node to the destination node d through a node z; and $I^*(i_1)$ represents a neighbor node set of the optimal next-hop node except the first node.

8. The method according to claim 6, wherein determining the transmission path of the service to be transmitted according to the Q table comprises:
   determining the transmission path of the service to be transmitted according to the direction of the optimal next-hop node relative to the first node in the Q table.

9. An electronic device, comprising: a memory, a processor, and a computer program stored in the memory and executable on the processor, wherein the processor executes the computer program to implement the adaptive routing method according to claim 1.

10. A non-transitory computer-readable storage medium, wherein the non-transitory computer-readable storage medium stores computer instructions, and the computer instructions are used to make a computer execute the adaptive routing method according to claim 1.

* * * * *